Nov. 15, 1966 J. F. THOMPSON ET AL 3,286,240

CHANNEL STATUS CHECKING AND SWITCHING SYSTEM

Filed Dec. 31, 1962 3 Sheets-Sheet 1

INVENTORS
James F. Thompson
Charles A. Zito

CHANNEL STATUS CHECKING AND SWITCHING SYSTEM

Filed Dec. 31, 1962 3 Sheets-Sheet 2

United States Patent Office 3,286,240

Patented Nov. 15, 1966

3,286,240

CHANNEL STATUS CHECKING AND SWITCHING SYSTEM

James F. Thompson, Wappingers Falls, and Charles A. Zito, Poughkeepsie, N.Y., assignors to International Business Machines Corporation, New York, N.Y., a corporation of New York Filed Dec. 31, 1962, Ser. No. 248,749

7 Claims. (Cl. 340—172.5)

This invention relates broadly to an improved switching system for selectively interconnecting a plurality of data processing devices and, more particularly, to such a switching system provided with means for checking the busy status of each one of the pair of individual devices before an interconnection thereof is made.

When several computers are serviced by a plurality of input-output devices, such as tape recorders, printers, typewriters, etc., it is desirable to provide means which will automatically interconnect one of the computers with a selected input-output (I/O) device. It is also necessary to prevent the interconnection if either the computer or the selected I/O device is already in use or busy. Furthermore, it is desirable to be able to interconnect pairs of I/O devices which are not connected to a computer.

In the past, programming techniques have been utilized to interrogate the status of two data processing devices which are to be interconnected. In the automatic telephoe switching art, when one telephone subscriber dials the number of another subscriber the connection is made and then, subsequently, a busy signal is produced if the dialed number is busy.

Therefore, the principal object of this invention is to provide an improved line switching and status checking system for the interconnection of computer channels and input-output channels wherein a selected computer channel and a selected I/O channel are each individually tested for a busy status so that a connection therebetween is made only when neither the computer nor the input-output unit is in a busy status.

Another object of this invention is to provide a line switching and status checking system incorporating logical circuits which function both to indicate individually the busy or non-busy status of each of two channels which are to be interconnected and also when neither of the two channels is in a busy status, to make the interconnection and then to indicate that the proper interconnection has been made.

A more specific object of this invention is to provide a switching system for interconnecting computers and input-output units and simultaneously interconnecting different input-output units whereby individual checks are made of the status of each computer or input-output unit before any interconnection is made.

Briefly, the foregoing objects are attained in a preferred embodiment of the invention by connecting a plurality of computer channels and a plurality of input-output devices to appropriate terminals of a two-dimensional switch matrix which is controlled both manually and by a computer program to provide simultaneous connections between pairs of computer channels and input-output units and also between pairs of input-output units. Addresses of the selected computer channel and the selected input-output unit to be interconnected are registered, decoded and compared through logic circuits with the condition of addressing triggers which store the addresses of the computers and I/O units which are busy to provide computer C BUSY and I/O BUSY signals at appropriate sample times when either the selected computer or I/O unit is busy. If a busy signal is not generated, the desired interconnection is made and the same logic circuits are subsequently utilized to generate at another appropriate sample time an ACCEPT signal to indicate that the desired interconnection has been made. Furthermore, the same logic circuits may be utilized to status check and interconnect various pairs of input-output units under either manual or computer program control.

Other objects of the invention will be pointed out in the following description and claims and illustrated in the accompanying drawings which disclose by way of example the principle of the invention and the best mode which has been contemplated of applying that principle.

Figures 3, 5:
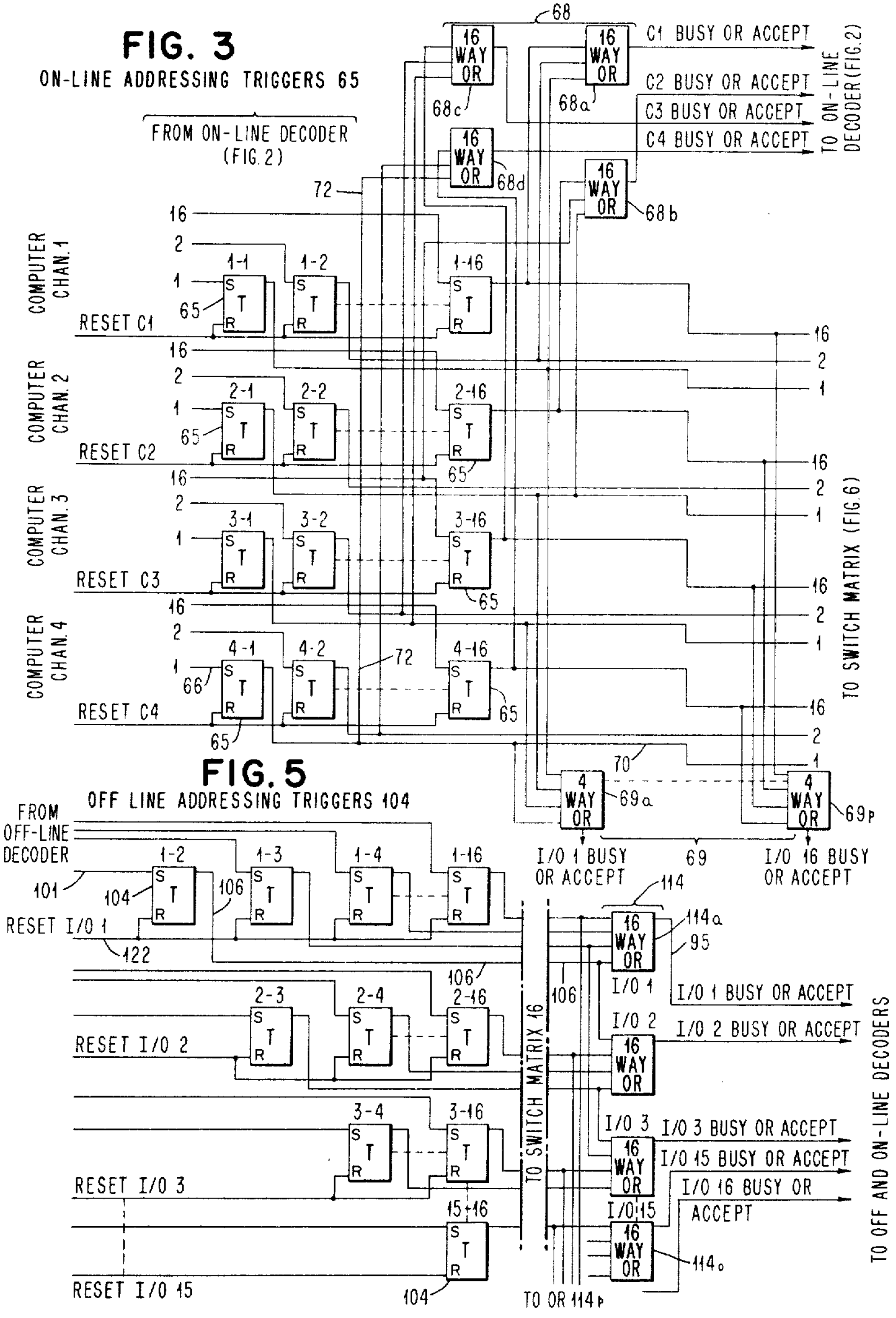
FIGURE 3 shows the addressing triggers and logic circuits necessary to generate the control signals associated with the on-line interconnection of pairs of computer channels and input-output units.
Figures 4A, 4B, 6:
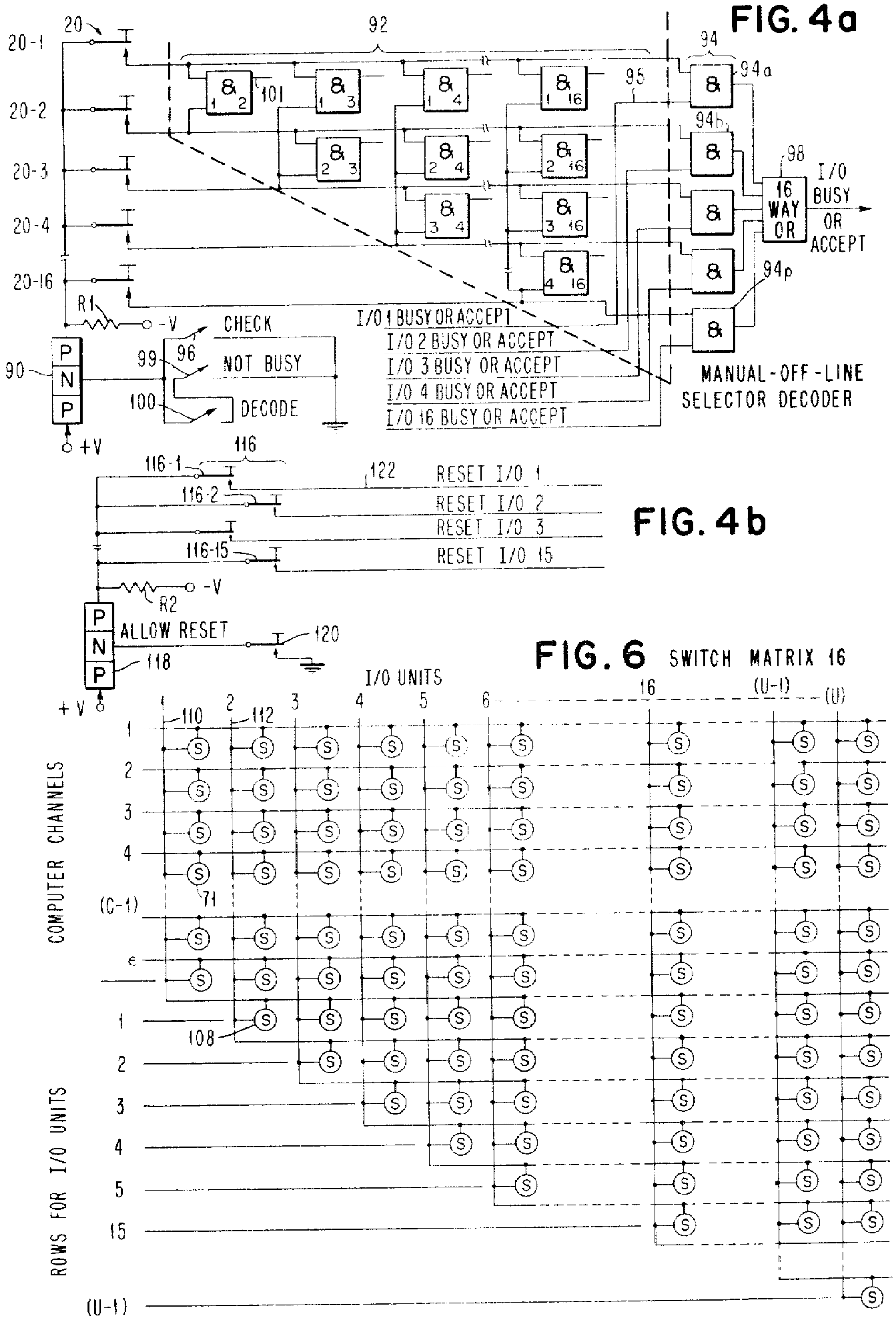

FIGURE 4*a* shows the logic circuits of the manual off-line selector-decoder for interconnecting pairs of input-output units;

FIGURE 4*b* shows a circuit for resetting the input-output addressing triggers;

FIGURE 5 shows the addressing triggers and logic circuits necessary to generate the control signals associated with the off-line interconnection of pairs of input-output units; and FIGURE 6 shows diagrammatically the switch matrix for interconnecting the various computer channels and input-output units.

Figures 1, 2:
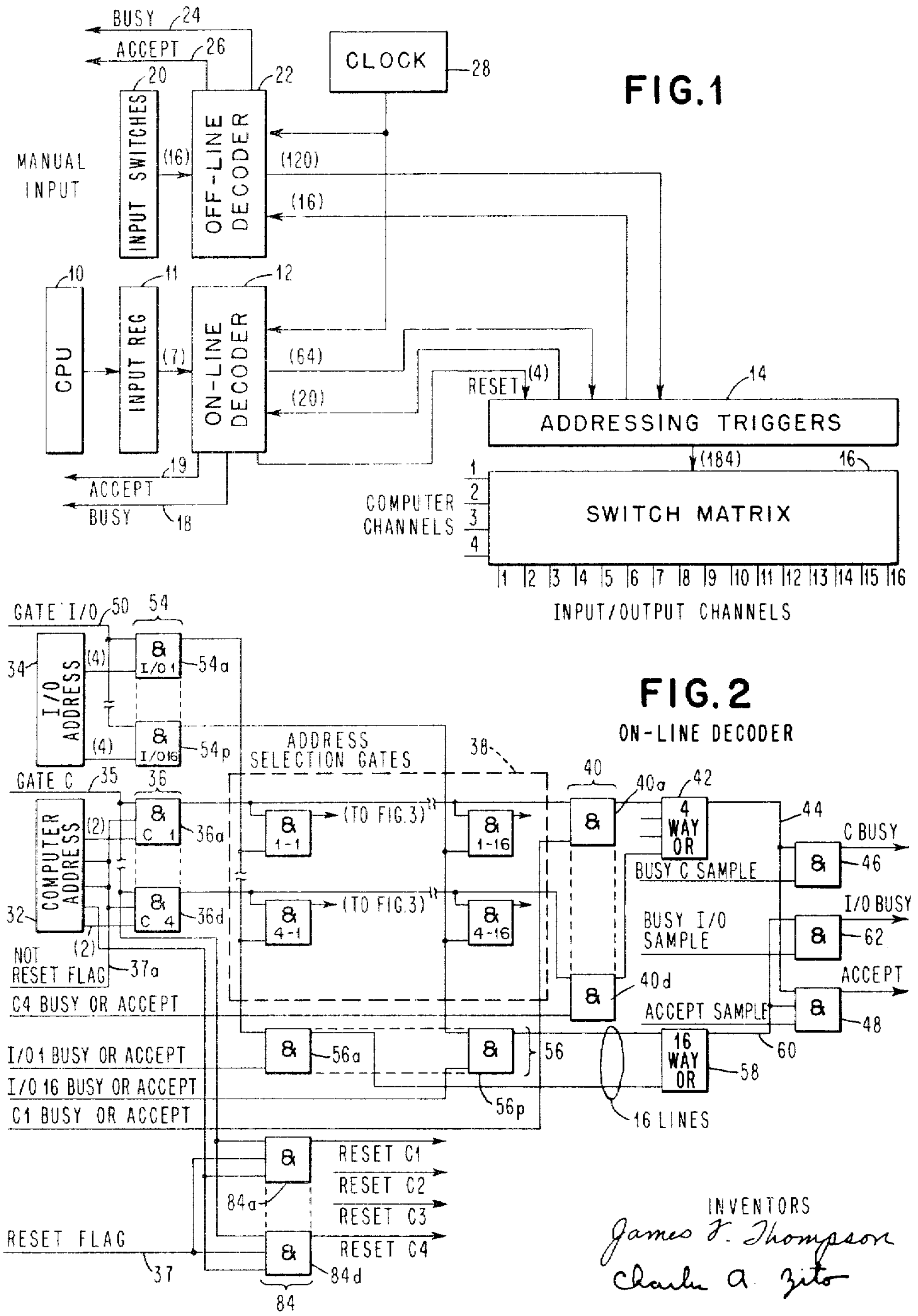
FIGURE 1 is a block diagram showing the complete organization of a switching and status checking system embodying this invention.
FIGURE 2 shows the logic circuits associated with the program controlled on-line decoder for interconnecting pairs of computer channels and I/O units.

In FIGURE 1, there is shown a block diagram of a preferred embodiment of this improved line switching and status checking system for data processing devices. The described system provides on-line operation for the interconnection of any one of four computer channels to any one of sixteen input-output units even though any number of computers and units may be used. The interconnection of computer and I/O channels is controlled by another computer or central processing unit (CPU) which functions to provide the necessary instructions to control this on-line operation. This system also provides for off-line operation wherein any two I/O channels may be manually interconnected.

In an on-line operation, CPU10 places in an input register 11 the addresses of a computer and an input-output unit which are to be interconnected. In this preferred embodiment, the addresses are in binary coded form which is decoded in a decoder 12 to select one of 184 addressing triggers 14 which operate a two-dimensional switch matrix 16. The four computer channels are connected to one side of switch matrix 16 and the sixteen input-output channels are connected to the other side. In a manner to be described in more detail below, before the interconnection between the addressed computer channel and input-output unit is made, suitable logical circuits are employed to determine whether the addressing triggers corresponding to the addressed computer channel and input-output unit are each set or reset thereby indicating busy or non-busy status respectively, of both the addressed computer channel and the addressed I/O unit. If either the computer channel or the input-output channel is in a busy status, a BUSY signal is generated by decoder 12 on line 18. If neither channel is busy, the corresponding addressing trigger is set to actuate switch matrix 16 which interconnects the two channels. Decoder 12 then generates an ACCEPT signal on line 19 to indicate that the desired connection has been made.

In the off-line operation, this switching system permits pairs of non-busy I/O units to be interconnected through switch matrix 16. These interconnections may be made by manually operating a bank of sixteen input or addressing switches 20, each of which corresponds to one of the sixteen input-output units. These switches correspond to input register 11 and are connected to an off-line decoder 22 which selects the addressing trigger corresponding to the two input switches which have been manually closed. In a manner similar to that described in conjunction with the CPU controlled on-line operation, the status of the two selected I/O units is checked to generate a busy signal on line 24 if either unit is in use and, if neither unit is busy, the desired interconnection is made and an ACCEPT signal is generated on line 26.

A clock generator 28 provides timing pulses for synchronizing the operation of the decoders in both the busy status check mode and accept modes. The numbers appearing over the lines in the drawing indicate the actual number of physical conductors represented by a single line. Each of the decoders may also contain priority circuits which give a CPU's requist for an interconnection between a computer channel and an I/O unit priority over a request for a manual interconnection between that I/O unit and another I/O unit. Even though in this preferred embodiment, the interconnection between two I/O units is manually controlled, it is apparent that these interconnections may also be controlled by a CPU program.

This switching system operates in such a manner that after an interconnection is made between two devices through the switch matrix, the associated logic circuits are then available to make subsequent interconnections since once an interconnection has been made, data flows directly from one channel to the other through the switch matrix. Consequently, any desired combination of computer channels and input-output channels may be simultaneously interconnected.

In FIGURE 2, there is shown a logic circuit diagram of the on-line decoder 12 which is used for an on-line operation of the switching system. One portion of input register 11 is the computer address register 32 which is loaded by the CPU with the binary coded address of a computer channel which is to be interconnected with one of the sixteen I/O unit channels. Another portion of the input register 11 is the I/O unit address register 34 which is loaded by the CPU with a binary coded address of the I/O unit which is to be interconnected with the computer channel whose address is stored in register 32.

In accordance with this invention before an interconnection is made, individual status checks are made to determine whether the addressed computer channel and the addressed I/O unit are each already in use. To accomplish this status check, the CPU generates on line 35 a GATE C control pulse which is applied as one input to each of four computer address-decoding AND gates 36*a, b, c, d*. Each of these AND gates has two other inputs which are various combinations of the two position, binary coded computer address as stored in register 32. This decoding arrangement is conventional and results in each of the AND gates 36 corresponding to one of the four computer addresses so that upon the occurrence of a GATE C control pulse, only the AND gate corresponding to the channel whose address is stored in register 32 will provide an output. Since the CPU does not provide a RESET FLAG at this time, line 37*a* is energized.

The output terminals of the AND gates 36 are each connected to address selection AND gates 38 in a manner to be described below and also to one input of corresponding AND gates 40*a, b, c, d*. A busy signal will appear on the other input of each of the four AND gates 40 whose corresponding computer channel is busy. This signal is identified as C BUSY OR ACCEPT and for AND gate 40*a*, for example, which corresponds to AND gate 36*a* and to computer channel 1, this signal is identified as C1 BUSY OR ACCEPT. The generation of these busy signals will be discussed later in connection with FIGURE 3.

If the computer channel whose address is stored in register 32 is busy, one of the AND gates 40 will provide an output through the four-way OR gate 42 along line 44 to one input of the AND gate 46 and also to one input of the AND gate 48. At the appropriate time, the clock 28 generates a BUSY C SAMPLE control pulse which is applied to the other input of AND gate 46 to generate a C BUSY signal when there is an output from OR 42 to indicate that the addressed computer channel is busy. This signal may be utilized to energize a suitable indicator or may be returned to the CPU as an indication that the addressed computer channel is already in a busy status to prevent the generation of control signals which would interconnect the addressed channels in a manner to be described later.

The status checking of the I/O unit whose address is held in register 34 is accomplished in much the same manner as just described for the addressed computer channel. If a C BUSY signal is not produced by AND gate 46, clock 28 then generates a GATE I/O control pulse on line 50 which is connected to one input of sixteen I/O address-decoding AND gates 54*a, b, c, . . . n, o, p*. The binary coded address for sixteen units has four binary positions and various combinations of these four positions are connected via four additional inputs to each of the AND gates 54 which function to decode the I/O address stored in register 34. Consequently, each of the AND gates 54 corresponds to the address of one of the I/O units and, upon the occurrence of the GATE I/O control pulse, only the AND gate 54 corresponding to the I/O channel whose address is stored in register 34 will provide an output. The output of each of the AND gates 54 is connected to one input of a corresponding one of sixteen AND gates 56*a, b, c, . . . n, o, p*, whose output terminals are connected in parallel as inputs to a sixteen-way OR gate 58. The other input of each of the AND gates 56 is connected to a line which may carry a busy signal from the corresponding I/O address trigger. These busy signals are identified as I/O BUSY OR ACCEPT. The generation of these busy signals will be discussed below in connection with FIGURE 3.

For example, AND gate 56*a* corresponds to I/O unit No. 1 and when this unit is busy, the signal appearing on the other input of AND gate 56a is I/O 1 BUSY OR ACCEPT. Consequently, when the addressed I/O unit is already busy, one of the AND gates 56 will provide an input to OR gate 58 which then provides an output pulse on conductor 60 which is connected to one input of an AND gate 62 and also to one input of AND gate 48. At the appropriate time, clock 28 generates a BUSY I/O SAMPLE control pulse which is applied as the other input to AND gate 62 to provide on the output thereof a busy signal which is identified as I/O BUSY, which may be utilized to energize an indicator or which may be returned to the CPU for further processing to prevent the interconnection of the addressed computer and I/O channels.

The function of AND gate 48 will be discussed in more detail below, but in passing it may be well to note that at another appropriate time clock 28 generates an ACCEPT SAMPLE pulse which is applied to the third input of AND gate 48 which produces an output signal ACCEPT to indicate that a desired interconnection between an addressed computer channel and an I/O channel has been made after the status checking cycle determined that neither of the channels was in use.

Let us now assume that neither the addressed computer channel nor the addressed I/O unit is busy so that neither a C BUSY OR ACCEPT signal nor an I/O BUSY OR ACCEPT signal will appear to activate any of the AND gates 40 and 56, respectively, and consequently, there will not be a C BUSY or I/O BUSY signal generated at the outputs of AND gates 46 and 62, respectively. Clock 28 then generates GATE I/O and GATE C control pulses simultaneously so that one of the AND gates 54 and one of the AND gates 36 will provide an output. These AND gates are not only connected to AND gates 40 and 56 as previously described, but are also connected to the input terminals of corresponding ones of the address selection AND gates 38. There are 64 of these AND gates 38 arranged in four rows and sixteen columns with each gate corresponding to one computer channel and one I/O unit. Such an arrangement is accomplished by connecting the output of each of the AND gates 36 to one row of AND gates 38 and the output of each of the AND gates 54 to one of the columns of AND gates 38. The numbers in the lower left and right corners of each AND gate block show respectively the computer channel and I/O unit which correspond to that AND gate.

The AND gate 38 which has both of its inputs energized by the outputs of AND gates 36 and 54 provides an output which sets a corresponding one of sixty-four addressing triggers 65 shown in FIGURE 3. The output lines from the sixty-four AND gates 38 in FIGURE 2 are shown in the left-hand margin in FIGURE 3. For example, if the register 32 holds the address of computer channel 4 and the register 34 holds the address of input-output unit No. 1, AND gate $38_{4-1}$ provides an output which is applied to conductor 66 in FIGURE 3 to the set input terminal S of addressing trigger $65_{4-1}$ to place it in its set state. An output voltage then appears at the output terminal trigger $65_{4-1}$ and this voltage is applied to the corresponding matrix switch (see FIGURE 6) to make the actual connection between the addressed I/O unit and computer channel.

This output voltage is also applied to a corresponding one of four sixteen-way OR gates 68 whose outputs provide the C BUSY OR ACCEPT signals to the AND gates 40 in FIGURE 2. For example, when addressing trigger $65_{4-1}$ is set, an output voltage is applied via a conductor 70 to the corresponding matrix switch 71 shown in FIGURE 6 and also via conductor 72 to one input of sixteen-way OR gate **68*d*. The output signal from this OR gate is C4 BUSY OR ACCEPT which in turn is applied to AND gate 40*d* in FIGURE 2. In like manner the outputs of OR gates 68*a*, 68*b* and 68*c* are applied to the inputs of AND gates 40*a*, 40*b* and 40*c***, respectively.

Furthermore, the outputs of triggers 65 are each connected to one of sixteen four-way OR gates 69 each corresponding to one column of addressing triggers 65. For the chosen example, an output signal I/O 1 BUSY OR ACCEPT will appear on the output terminal of OR gate **69*a* and will also appear as a busy signal input to AND gate 56*a*** in FIGURE 2.

In FIGURE 6 there is shown diagrammatically, the switch matrix 16 which actually forms the interconnection between computer channel C4 and I/O unit No. 1. The matrix consists of a plurality of individual switches S arranged in columns and rows. The switches are preferably of electronic type, such as tunnel diode, transistor, diode, or neon lamp-photoconductor switching circuits, but for ease of understanding they may each be considered merely as a conventional relay switch whose contacts are closed when the relay coil is energized by the output voltages of the addressing triggers 65. For the example chosen, the output voltage from addressing trigger $65_{4-1}$ is applied via conductor 70 to switch 71 of switch matrix 16 to complete the connection between channel C4 and I/O unit No. 1. Addressing trigger $65_{4-1}$ remains in its set condition as long as switch 71 is closed. Once a switch is closed, no other switch in its respective row or column can be actuated.

Looking at FIGURE 2 again, we can now see the manner in which the C BUSY OR ACCEPT signals are also utilized to indicate that the desired connection has been made. Clock 28 again generates at GATE C pulse on line 35 simultaneously with the generation of a GATE I/O pulse on line 50. Since the addresses of the selected computer channel and selected I/O unit are still held in register 32 and 34, respectively, one of the AND gates 36 and one of the AND gates 54 will each provide output pulses which are applied to corresponding ones of AND gates 40 and 56, respectively; more specifically for the case where the address of computer channel C4 is stored in register 32 and the address of I/O unit No. 1 is stored in register 34, AND gate **36*d* will provide an output to AND gate 40*d* and AND gate 54*a* will provide an output to AND gate 56*a***.

However, the other input of AND gate **40*d* is also energized by virtue of the appearance of the C4 BUSY OR ACCEPT signal derived from the output of on-line addressing trigger $65_{4-1}$ via OR gate 68*d* in FIGURE 3. Therefore, an output pulse will be applied from AND gate 40*d* through OR gate 42 and conductor 44 to the inner input terminal of AND gate 48**.

In like manner, the other input of AND gate **56*a* will be energized by the I/O 1 BUSY OR ACCEPT signal derived from addressing trigger $65_{4-1}$ via OR gate 69*a* Consequently, AND gate 56*a* will also provide an output pulse through OR gate 58 and conductor 60 to the middle input terminal of AND gate 48. Clock 28 then generates an ACCEPT SAMPLE pulse which gates an ACCEPT signal to the output of AND gate 48**. This ACCEPT signal may be utilized to light an indicator lamp or else it may be fed back to the CPU to be stored as an affirmative response to the original instruction thereby indicating that the desired interconnection has been made.

When it is desired to disconnect a computer channel and an input-output unit which are connected through the switch matrix 16, the CPU generates a disconnect instruction which is similar to a connect instruction with the addition of a RESET FLAG on line 37. The registered address of the connected computer channel is ANDed with these pulses in four AND gates 84 to produce suitable reset pulses. For example, when computer channel C4 and I/O unit No. 1 are to be disconnected, a GATE C pulse is applied via conductor 35 to one of the inputs of AND gates **84*d*. Two of the other three inputs to each of these AND gates is the binary coded address of the computer channel from register 32. The third input to each of these AND gates is the RESET FLAG. For the case at hand, only AND gate 84*d* will provide an output pulse which is identified as RESET C4, and which is applied to the reset terminals R of each of the sixteen on-line addressing triggers 65 corresponding to computer channel. 1**. Thas is, RESET C4 will attempt to reset all the triggers in the last row shown in FIGURE 3, but only trigger $65_{4-1}$ will be in its set state and is the only one which will be reset.

FIGURES 4*a* and 4*b* show the details of the off-line decoder 22. One side of each of the sixteen switches 20 is connected to the collector of a transistor 90 and via a resistor $R_1$ to a negative potential $-V$. The other side of each switch is connected both to one input of a corresponding row of off-line address selection AND gates 92 and also to one input of a corresponding one of sixteen off-line status AND gates 94.

Transistor 90 is normally non-conducting so that $-V$ is applied across all the switches 20, and even if one or more switches should be accidentally closed, none of the address selection AND gates 92 or AND gates 94 will be energized since they each require the simultaneous application of positive voltages on their two inputs to provide an output.

For an off-line or I/O—I/O connection, CHECK switch 96 is first closed to render transistor 90 conducting and apply $-V$ potential to the common side of switches 20. If, for example, it is desired to interconnect I/O units No. 1 and No. 2, the status of I/O 1 is first checked. Switch 20–1 is then closed to apply $-V$ to the upper input terminal of status AND gate 94*a*. If I/O unit No. 1 is busy, an I/O 1 BUSY OR ACCEPT signal will appear on line 95 which is connected to the lower input terminal of status AND gate 94*a* which will then provide an output which is applied through a sixteen-way OR gate 98 to produce an I/O BUSY signal which may energize a lamp or alarm to indicate to the operator that I/O 1 is in use so that the desired interconnection would not be made. However, if I/O unit No. I is not busy, there will be no I/O BUSY signal from OR gate 98 and the operator will then manually open switch 20–1 and close switch 20–2 in order to test the status of I/O unit No. 2 in the same manner. After the checking operations are completed, switch 96 is opened to turn off transistor 90.

If neither I/O unit is busy, a NOT BUSY switch 99 is closed and both switches 20–1 and 20–2 are manually closed. However, transistor 90 is not turned on because there is connected in series with switch 99 a DECODE switch 100 which is open. In order to interconnect I/O 1 and I/O 2, decode switch 100 is now closed to turn on transistor 90 and apply +V to both input terminals of address selection AND gate $92_{1\text{-}2}$ to provide an output therefrom on line 101. None of the other address selection AND gates 92 will have +V applied to both input terminals so only gate $92_{1\text{-}2}$ will provide an output which is applied to the set terminal S of its corresponding off-line addressing trigger $104_{1\text{-}2}$ (shown in FIGURE 5) is then placed in its set state to generate an output voltage on line 106 which in turn is connected to the switch 108 in switch matrix 16 (FIGURE 6). This output voltage actuates switch 108 to close a path between I/O 1 terminal 110 through switch 108 to I/O 2 terminal 112. The outputs of the other address selection AND gates 92 are connected to the set terminals of corresponding triggers 104 whose outputs close corresponding individual switches in matrix 16. Once a switch is closed, no other switch in its respective column can be actuated.

A double check is provided to indicate that the desired interconnection has been made since the output from off-line addressing AND trigger $104_{1\text{-}2}$ is also applied via line 106 as an input to a sixteen-way OR gate 114*a* whose output is identified as the I/O 1 BUSY OR ACCEPT signal which is applied via conductor 95 to one of the inputs of status AND gate 94*a*. The other input is also energized since switch 20–1 is closed, thereby providing a continuous I/O BUSY OR ACCEPT signal at the output of OR gate 98. During the status checking operation, this signal was interpreted as a BUSY signal, but now it is interpreted as an ACCEPT signal to indicate that the connection between I/O units No. 1 and No. 2 has been completed.

Resetting of the off-line addressing triggers 104 in order to break this connection is also manually controlled by means of a reset circuit shown in FIGURE 4*b*. Since the I/O units are interconnected in pairs, it is necessary to provide only fifteen reset switches 116 to reset the respective fifteen rows of addressing triggers 104 shown in FIGURE 5. For example, if it is desired to break the connection between I/O units No. 1 and No. 2, either switch 116–1 or 116–2 may be closed. A normally non-conducting transistor 118 is connected to the common side of each of the switches 116 in the same manner in which transistor switch 90 is connected to switches 20 in FIGURE 4*a*. A −V potential is applied via a resistor $R_2$ to the collector of transistor 118 so that −V is normally applied to the common side of switches 116. Reset cannot yet occur since a +V voltage must be applied to the reset terminals R of the triggers 104 in order to reset them. However, when the ALLOW RESET switch 120 in series with the base of transistor 118 is closed, the potential +V is applied to the common side of the switches 116 so that +V will be applied to the output side of any switch which is closed. For example, if switch 116–1 is closed, a positive potential of +V appears on line 122 and is identified as RESET I/O 1 which is then applied to the reset terminal R of addressing trigger $104_{1\text{-}2}$ to reset the trigger and open matrix switch 108 to disconnect I/O 1 and I/O 2. RESET I/O 1 is applied to all addressing triggers 104 in the first row shown in FIGURE 5 to reset or break the connection between I/O and any other I/O. Each row has one less trigger than the preceding row and only fifteen rows are necessary in order to provide connections between all possible combinations of pairs of I/O's.

It can be seen from the foregoing description of the preferred embodiment of this invention that there has been provided a novel channel switching and status checking system whereby the status of two data processing devices may be individually checked for a busy or non-busy status by suitable logical circuits before an actual connection between the two devices is made. If either of the two devices is busy, a busy signal will be produced so that the desired interconnection is not attempted. Furthermore, after a desired interconnection has been successfully made, the same logical circuits may be utilized to produce an accept signal to indicate that the desired connection has been made.

While there have been shown and described and pointed out the fundamental novel features of the invention as applied to a preferred embodiment, it will be understood that various omissions, substitutions, and changes in the form and detail of the system illustrated and its operation may be made by those skilled in the art without departing from the spirit of the invention. It is the intention, therefore, to be limited only as indicated by the scope of the following claims.

What is claimed is:

1. A channel status checking and switching system comprising first storage means for holding an address of a selected one of a plurality of first channels, second storage means for holding an address of a selected one of a plurality of second channels, first decoding means responsive to said first and second storage means for determining a busy status of each of a selected first and second channel, said first decoding means providing a first connection signal when neither of a pair of selected channels is busy, and a switch matrix including a first plurality of individual switching units interposed between respective pairs of said first and second channels, said individual switching units being responsive to first connection signals to interconnect respective pairs of selected first and second channels.

2. A channel status checking and switching system as defined in claim 1 further comprising a first plurality of address storing devices, each storing the addresses of a different selected pair of first and second channels which are interconnected by one of said individual switching units, said first decoding means also being responsive to said first plurality of address storing devices.

3. A channel status checking and switching system as described in claim 2 further comprising means for selecting a pair of said second plurality of channels to be interconnected, second decoding means responsive to said selecting means for determining a busy status of each selected second channel, said second decoding means providing a second connection signal when neither of a pair of selected second channels is busy, said matrix including a second plurality of individual switching units interposed between respective pairs of said second channels, said second plurality of individual switching units being responsive to second connection signals to interconnect respective pairs of selected second channels.

4. A channel status checking and switching system as defined in claim 3 further comprising a second plurality of address storing devices, each storing the addresses of a different pair of selected second channels which are interconnected by said second plurality of individual switching units, said first and second decoding means each being responsive to said second plurality of address storing devices.

5. A channel status checking and switching system for interconnecting selected pairs of *m* first channels and *n* second channels comprising a two dimensional switch matrix including $m \times n$ normally open individual switches, said first channels being connected to the *m* dimension of said matrix and said second channels being connected to the *n* dimension of said matrix, a plurality of bistable storage devices, means coupling each of said individual switches to corresponding ones of said bistable storage devices, means for selectively placing each of said storage devices in a set condition to close an individual switch coupled thereto and interconnect a pair of first and second channels, register means for holding the addresses of a selected first and a selected second channel to be interconnected, coincidence means responsive to said register means and to said storage devices to produce an output signal when either of said selected first and second channels is connected to a closed switch, gate means connected to the output of said coincidence means, and means to sample sequentially said gate means to provide individual first channel and second channel busy signals.

6. A channel status checking and switching system for interconnecting selected pairs of *m* first channels and *n* second channels comprising a first register for storing the address of a selected first channel, a second register for storing the address of a selected second channel, *m* first decoding AND gates connected to said first register, means to apply a first channel gate signal to all of said first decoding AND gates to produce a first decode pulse on the output of a first decoding AND gate corresponding to the addressed selected first channel, *m* status AND gates each connected to the output of a corresponding one of said first decoding AND gates, first circuit means producing first busy signals each corresponding to a busy status of one of said first channels, means to apply each of said first busy signals to corresponding ones of said *m* status AND gates to produce a selected first channel busy signal, *n* decoding AND gates connected to said second register means, means to apply a second channel gate signal to all of said second decoding AND gates to produce a second decode pulse on the output of a second decoding AND gate corresponding to the addressed selected second channel, *n* status AND gates each connected to the output of a corresponding one of said second decoding AND gates, second circuit means producing second busy signals each corresponding to a busy status of one of said second channels, means to apply each of said second busy signals to corresponding ones of said *n* status AND gates to produce a selected second channel busy signal, and means to sample sequentially said selected first and second channel busy signals.

7. A channel status checking and switching system as defined in claim 6 further comprising an $m \times n$ switch matrix for interconnecting selected pairs of said first and second channels, and address storage means responsive to said first and second decode pulses and to the absence of said selected first and second channel busy signals to actuate said switch matrix to interconnect said selected first and second channels, said first and second circuit means being responsive to said address storage means to produce an accept signal indicating that said first and second selected channels have been interconnected.

References Cited by the Examiner

UNITED STATES PATENTS 3,158,844 11/1964 Bowdle ----------- 340—172.5

ROBERT C. BAILEY, *Primary Examiner.*

M. LISS, *Assistant Examiner.*